United States Patent
Russberg

(10) Patent No.: US 8,181,670 B2
(45) Date of Patent: May 22, 2012

(54) VALVE APPARATUS

(75) Inventor: Gunnar Russberg, Västerås (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 12/916,245

(22) Filed: Oct. 29, 2010

(65) Prior Publication Data

US 2011/0095647 A1   Apr. 28, 2011

Related U.S. Application Data

(63) Continuation of application No. PCT/EP2009/054866, filed on Apr. 23, 2009.

(30) Foreign Application Priority Data

Apr. 30, 2008   (EP) .................................... 08155478

(51) Int. Cl.
  *F16K 11/074* (2006.01)
  *F16K 47/00* (2006.01)
(52) U.S. Cl. .................................. 137/625.46; 251/118
(58) Field of Classification Search .................... 60/303; 137/597, 625.47, 607, 625.46; 251/127, 251/118
  See application file for complete search history.

(56) References Cited

U.S. PATENT DOCUMENTS

| | | | | |
|---|---|---|---|---|
| 2,814,307 A | * | 11/1957 | Hafele et al. | 137/489 |
| 3,375,855 A | * | 4/1968 | Deeks | 138/42 |
| 3,590,872 A | * | 7/1971 | Baity | 137/625.46 |
| 3,888,458 A | * | 6/1975 | Bubniak et al. | 251/118 |
| 4,827,980 A | * | 5/1989 | Mazzei et al. | 137/625.46 |
| 5,083,041 A | | 1/1992 | Hardt et al. | |
| 5,411,059 A | * | 5/1995 | Sever et al. | 137/599.04 |
| 7,513,890 B2 | * | 4/2009 | Usher et al. | 604/248 |
| 7,600,535 B2 | * | 10/2009 | Baumgarten et al. | 137/625.43 |
| 2006/0226728 A1 | | 10/2006 | Pal | |

(Continued)

FOREIGN PATENT DOCUMENTS

DE   19860637 A1   7/2000

(Continued)

OTHER PUBLICATIONS

International Search Report and Written Opinion of the International Searching Authority; PCT/EP2009/054866; Jul. 1, 2009; 11 Pages.

*Primary Examiner* — Julio Gonzalez
(74) *Attorney, Agent, or Firm* — St. Onge Steward Johnston & Reens LLC

(57) ABSTRACT

A rotating valve apparatus includes a cylindrical casing; a shaft arranged symmetrically in the casing; a member fixedly attached to the shaft and in close fit with the cylindrical casing, defining separated chambers within the casing; at least one outlet fixedly arranged along the circumference of the casing; and a plurality of axially arranged inlets, each of which being constantly in fluid communication with a respective one of the separated chambers, wherein the axially arranged inlets are alternately in fluid connection with the outlet fixedly arranged along the circumference of the casing in response to rotation of the shaft and the member with respect to the casing. The outlet(s) has/have a fluid path length that varies along the circumference of the casing depending on the rotational speed of the shaft such that the interfaces between fluids originating from different ones of the axially arranged inlets will be essentially vertical to the flow direction of the fluids.

10 Claims, 4 Drawing Sheets

U.S. PATENT DOCUMENTS

| | | |
|---|---|---|
| 2007/0157615 A1 | 7/2007 | Morgenstein |
| 2007/0175217 A1 | 8/2007 | Fellows |
| 2010/0117482 A1* | 5/2010 | Russberg et al. ............. 310/306 |
| 2010/0253094 A1* | 10/2010 | Russberg et al. ............. 290/1 R |
| 2010/0258194 A1* | 10/2010 | Kim ................................. 137/1 |
| 2011/0057539 A1* | 3/2011 | Russberg et al. ............. 310/301 |

FOREIGN PATENT DOCUMENTS

| | | |
|---|---|---|
| EP | 1876350 A1 | 1/2008 |
| JP | 63235775 A | 9/1988 |
| JP | 7107764 A1 | 4/1995 |
| WO | 03104726 A1 | 12/2003 |

* cited by examiner

VALVE APPARATUS

CROSS-REFERENCE TO RELATED APPLICATIONS

The present application is a continuation of pending International patent application PCT/EP2009/054866 filed on Apr. 23, 2009, which designates the United States and claims priority from European patent application 08155478.4 filed on Apr. 30, 2008, the content of which is incorporated herein by reference.

FIELD OF THE INVENTION

The present invention generally relates to valve apparatuses. The invention is preferably, but not exclusively, intended for a generator system for converting thermal energy to electric energy.

BACKGROUND OF THE INVENTION

In known generator systems for converting thermal energy to electric energy there is provided a magnetic circuit of a suitable magnetic material and a coil arranged around the magnetic circuit. A temperature-varying arrangement varies the temperature of the magnetic circuit alternately above and below a phase transition temperature such as the Curie point to thereby vary the reluctance of the magnetic circuit and the resulting magnetization of the magnetic circuit is modulated by the varying reluctance so as to induce electric energy in the coil arranged around the magnetic circuit. The temperature-varying arrangement passes alternately hot and cold fluid by the magnetic circuit and comprises typically one or several feed pumps, piping, and a valve manifold.

JP 7107764 discloses such generator system provided with a switch valve comprising a hot water inlet port, a cold water inlet port, and outlet pipes. When the switch valve rotates the outlet pipes receive alternately water from the hot water inlet port and the cold water inlet port. The phase between the outlet pipes is 180°.

SUMMARY OF THE INVENTION

A problem of such arrangement is that energetically inefficient cycling of fluid is achieved and that disturbances during fluid switching occur.

If the switch valve described above was provided with larger and/or more outlets at different phases, the disturbances during fluid switching are minimized. The larger the total area of the outlets is, the lower are the losses and pressure disturbances.

However, the larger the total area of the outlets is, the larger is the tendency for the fluid pulses to mix during switching, which reduces the quality of the train of fluid pulses, unless the number of outlets is increased.

If the valve apparatus is to be used in a thermomagnetic generator system of an electric power plant, the relative size and cost per net power produced increase with the number of outlets since conductor and core materials are not utilized in an optimum manner for several outlets as compared to a single outlet.

Another limitation is that if an outlet of the valve apparatus has a large dimension in the circumferential direction, fluid portions emanating from this outlet, and which thus belong to the same fluid pulse, may have substantially different phases downstream of the outlet since these fluid portions are phase shifted with respect to one another, in a similar manner as fluid pulses from different outlets are phase shifted from one another.

It is therefore an object of the present invention to provide a valve apparatus, by which the above limitations can be overcome.

It is a particular object of the invention to provide such valve apparatus, which can provide for a smooth and energetically efficient cycling of fluid while the phase shifts between fluid pulses from different outlets or from laterally separated portions of a fluid pulse can be controlled.

It is still a further object of the invention to provide such valve apparatus, which is dynamically controllable, reliable, flexible, and of reasonable cost.

It is still a further object of the invention to provide such valve apparatus, which has a simple structure and operation.

It is yet a further object of the invention to provide such valve apparatus, which can be used in a temperature-varying arrangement for a generator system that converts thermal energy to electric energy.

These objects, among others, are according to the present invention attained by valve apparatuses as specified in the appended patent claims.

According to one aspect of the invention there is provided a valve apparatus, which comprises a casing; a shaft arranged symmetrically in the casing; a member fixedly attached to the shaft and in close fit with the cylindrical casing, thereby defining separated chambers within the casing; at least one outlet fixedly arranged along the circumference of the casing; and a plurality of axially arranged inlets, each of which being constantly in fluid communication with a respective one of the separated chambers. The separated chambers and thereby the axially arranged inlets are alternately in fluid connection with the at least one outlet in response to rotation of the shaft and the member with respect to the casing. The at least one outlet has a fluid path length that varies along the circumference of the casing depending on the rotational speed of the shaft and the member such that the interfaces between fluids originating from different ones of the axially arranged inlets will be essentially vertical to the flow direction of the fluids downstream of the at least one outlet.

Embodiments of the invention are set out in the dependent claims and are disclosed in the detailed description.

The present invention features a valve apparatus, which is simple, reliable, and robust, and by which smooth and energetically efficient pumping and distribution of fluids, can be made while any number of outlets can be chosen arbitrarily. The invention realizes single-phase switching for a valve apparatus having a plurality of outlets. Larger total outlet area is feasible, which reduces pressure drops and losses. The thermal quality of the trains of fluid pulses can be improved.

The valve apparatus of the present invention can be used for the thermal cycling of fluid in a thermomagnetic generator device or can be used in entirely different applications, in which fluids of different characteristics should be alternately output in a single outlet.

For a thermomagnetic generator device the invention solves naturally the problem of distributing fluid to a remote and extended core region of the thermomagnetic generator device.

Further characteristics of the invention and advantages thereof, will be evident from the following detailed description of preferred embodiments of the present invention given hereinafter and the accompanying FIGS. 1-7, which are given by way of illustration only and thus, are not limitative of the present invention.

DETAILED DESCRIPTION OF THE INVENTION

Figure 1:
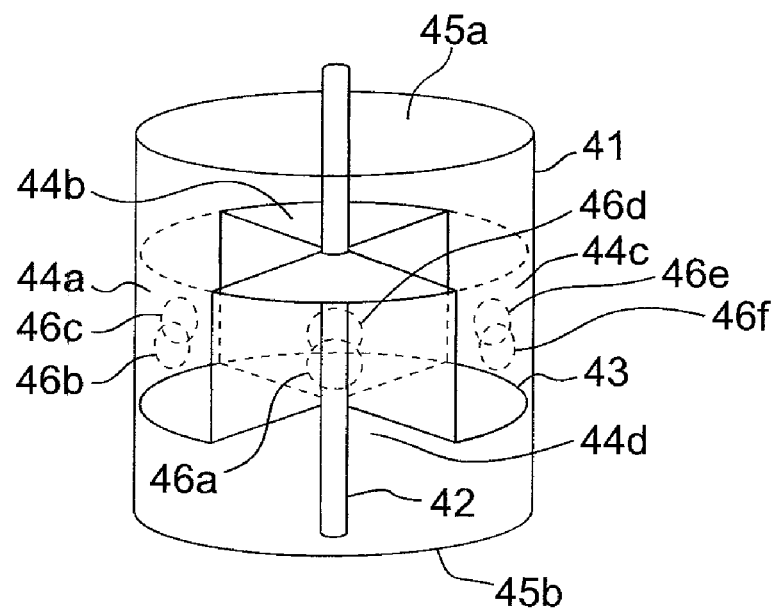
FIGS. 1-3 display each schematically in a perspective view a rotating valve apparatus in which the present invention can be implemented.

A rotating valve apparatus is disclosed in FIG. 1. A hollow cylinder or cylindrical casing 41 houses a symmetrically arranged rotatable shaft 42, to which a member 43 is fixedly attached. The member 43, which preferably is thermally isolating, is provided in close fit with the cylindrical casing 41 and defines four essentially separated and identical compartments or chambers 44*a-d* of the apparatus. Each of the chambers 44*a-d* is defined by two sidewalls that extends radially from the shaft 42 and to the casing 1 and axially, and a top cover that extends radially from the shaft 42 and to the casing 1 and circumferentially between the two sidewalls. Two of the chambers 44*a*, 44*c* are constantly in fluid communication with a first axially arranged inlet 45*a*, and is configured to receive or output fluid of a first characteristic, and two of the chambers 44*b*, 44*d* are constantly in fluid communication with a second axially arranged inlet 45*b*, and is configured to receive or output fluid of a second characteristic.

Further, a number of outlets 46*a-f* is arranged circumferentially in the casing 41, preferably with equal distances between one another. The circumferentially arranged outlets 46*a-f* can alternately be put in fluid communication with the respective chambers 44*a-d* by rotating the shaft 42 and the member 43, thereby also rotating the chambers 44*a-d*.

The shaft 42 is advantageously mounted in the cylindrical casing 41 by means of bearings and means, e.g. an electric motor (not illustrated), is provided to apply a driving torque on the shaft 42. Alternatively, the rotating valve apparatus is self-propulsive in response to being exposed to fluids flowing through the inlets of the rotating valve apparatus by means of a pump arrangement). In yet an alternative version the valve device has an integrated impeller arrangement for the circulation, i.e. pumping, of the fluids (in which instance any external pump arrangement may be dispensed with). Such impeller arrangement can be separated from the member 43 or it can be integrated with the member 43 into a single-piece device by means of suitably shaping the surfaces of the member 43 in the two axial directions to resemble the operation of impellers. Such combined pump and valve apparatus is described in our copending European patent application No. XX filed on YYYY ZZ, 2007, the contents of which being hereby incorporated by reference.

During operation of the valve apparatus in a first operation mode, the shaft 42 and thereby the member 43 are steadily rotated with respect to the casing 41 and the outlets 46*a-f*, thereby sucking a fluid of a first characteristic through the first axially arranged inlet 45*a* and into the two chambers 44*a*, 44*c* constantly in fluid communication with the first axially arranged inlet 45*a*, and sucking a fluid of a second characteristic trough the second axially arranged inlet 45*b* and into the two chambers 44*b*, 44*d* constantly in fluid communication with the second axially arranged inlet 45*b*. As the member 43 and thus the chambers 44*a-d* thereof are rotated with respect to the casing the fluids of the first and second characteristics are alternately output through the circumferentially arranged outlets 46*a-f*.

The circumferentially arranged outlets 46*a-f* alternately output pulses of fluids of the first and second characteristics. The rotational speed for a given number of chambers controls the wavelength and frequency of the train of fluid pulses and the angular separation of the outlets controls the phase shift between them.

The fluids of the first and second characteristics may be fluids, such as e.g. water or other heat exchange fluid, of different temperatures. Alternatively, different fluids or fluids having different properties are mixed by the valve apparatus.

In a second operation mode the valve apparatus operates in a reciprocal manner to divide up fluid pulses of the first and second characteristics received at the circumferentially arranged outlets 46*a-f*, being inlets in this operation mode. The shaft 42 and thereby the member 43 are steadily rotated in the opposite direction with respect to the casing 41 and the outlets 46*a-f*. Hereby, the fluid pulses of the first and second characteristic are sucked through the circumferentially arranged outlets 46*a-f* and alternately into the respective chambers 44*a-d* of the casing 41. The fluid pulses that are collected in the two chambers 44*a*, 44*c* constantly in fluid communication with the first axially arranged inlet 45*a* is output there through, and the fluid pulses that are collected in the two chambers 44*b*, 44*d* constantly in fluid communication with the second axially arranged inlet 45*b* is output there through. Thus, the axially arranged inlets 45*a-b* are outlets in this operation mode. If the rotational speed of the shaft 42 is adapted to the frequency of the fluid pulses and the phase shift between the fluid pulses at the circumferentially arranged outlets 46*a-f* is adapted to the angular separation of the circumferentially arranged outlets 46*a-f*, fluid of the first characteristic can be collected by the valve apparatus and output though the first axially arranged inlet 45*a* and fluid of the second characteristic can be collected by the valve apparatus and output through the second axially arranged inlet 45*b*.

It should be understood by a person skilled in the art that even if the apparatus is described in the present text and in the appended patent claims as having axially arranged inlets and circumferentially arranged outlets, they can be operated as axially arranged outlets and circumferentially arranged inlets as described above. Thus, the wording used covers both operation modes.

Figure 2:
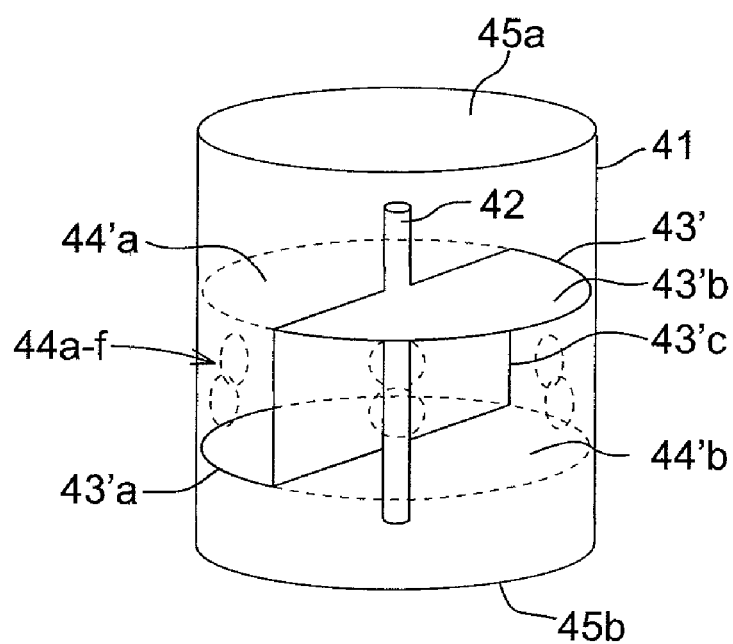

FIG. 2 illustrates a valve apparatus, which differs from the one of FIG. 1 in that the member 43 is exchanged for another member 43', which defines only two chambers 44'*a-b*. The member 43', which is fixedly mounted at the shaft 42, has two end portions 43'*a-b* covering each essentially a respective half of the cross section of the casing 41 and an intermediate portion 43'*c* separating the two end portions axially. Thus, each of the outlets 46'*a-f* at the circumference of the cylindrical casing 41 is alternately in fluid connection with the first and second chambers 44'*a-b* as the shaft 42 and the member 43' are rotated with respect to the cylindrical casing 41.

Since the valve apparatus of FIG. 2 comprises only two chambers 44'*a-b*, the frequency of the output pulses will be half of the frequency of the fluid pulses produced by the valve apparatus of FIG. 1.

Figure 3:
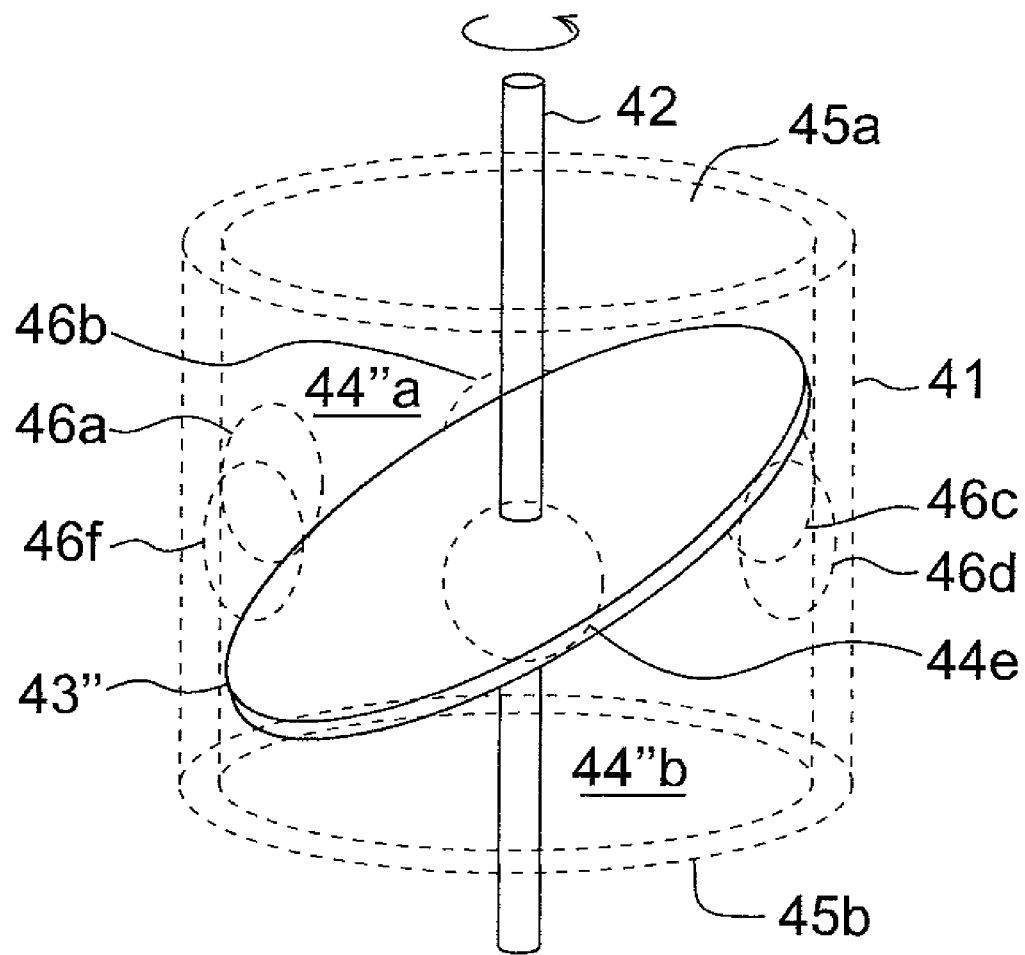

FIG. 3 illustrates a valve apparatus, which differs from the one of FIG. 2 in that the chamber-dividing and rotating member 43' is exchanged for an elliptic disc 43" fixedly mounted on the shaft 42 in an inclined position. The elliptic disc 43" is arranged in close fit with the cylindrical casing 41, to define a first and a second chamber 44"*a-b*. The elliptic disc 43" is arranged at an axial position and with an inclination angle such that each of the outlets 46a-f at the circumference of the cylindrical casing 41 is alternately in fluid connection with the first and second chambers 44″a-b as the shaft 42 and the elliptic disc 43″ are rotated with respect to the cylindrical casing 41.

The elliptic plate might be fabricated by cutting it from a predrilled solid cylinder having a diameter slightly less than the inner diameter of the cylindrical casing.

In the valve apparatuses of FIGS. 1-3 six outlets 46a-f are provided. However, the invention is not limited in this aspect. The number of outlets may range from one and upwards.

In the valve apparatuses, a small separation between the chamber-dividing and rotating member/elliptic disc and the wall of the cylindrical casing may advantageously be allowed, reducing or eliminating solid-to-solid contact forces with only negligible amounts of fluid being mixed.

The rotating valve apparatuses are capable of distributing industrial scale amounts of fluids with different characteristics to a common outlet (or several common outlets) with minimal mixing on a sub-second scale. The valve apparatus allows for a steady fluid flow with minimal disturbance from switching, minimal switching power demand, and a long lifetime with the ability to switch millions of cycles. Conventional valve arrangements either are too slow, too disruptive (flow stop, pressure waves), power demanding and/or wear out after rather short a number of cycles.

The rotating valve apparatus is applicable for industrial processes which involve alternating distribution of fluid with different characteristics into a common outlet, keeping the fluids separated with minimal mixing at a rate of a few cycles per second, continuously for e.g. several years. The fluids have preferably roughly similar fluid properties concerning e.g. density, viscosity, etc. They may consist of different substances, like water and ethanol, or of the same substance in different property states, like hot and cold water or other heat exchange fluid.

Particularly, the rotating valve apparatuses can be applied in a thermomagnetic or magnetothermal generator system of an electric power plant. Such magnetothermal generator system are further described in e.g. as well as in our copending Swedish patent applications Nos. 0700779-2, 0700780-0, and 0700781-8 filed on Mar. 28, 2007, the contents of which being hereby incorporated by reference.

Any of the above described valve apparatuses may be provided with phase delayed outlets in accordance with the present invention.

Consider a valve apparatus similar to any of the above described embodiments, but having N outlets, referred to below as main phase outlets, where N is 1 or larger. Each main phase outlet is then subdivided into M sub-outlets (channels, pipes, or similar) of equal cross-sectional area.

Figure 4A:
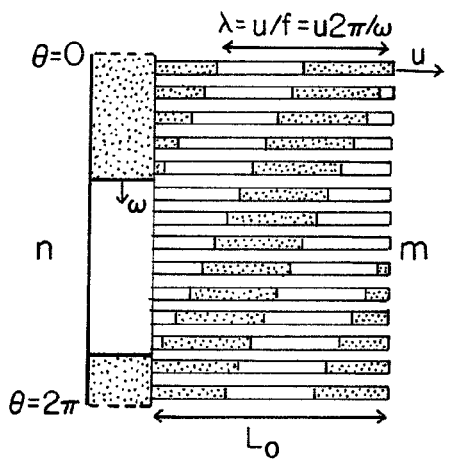
FIGS. 4*a-b* display schematically pulse trains from a rotating valve apparatus without and with phase delayed outlets as realized through tailor suited fluid paths.
Figure 4B:
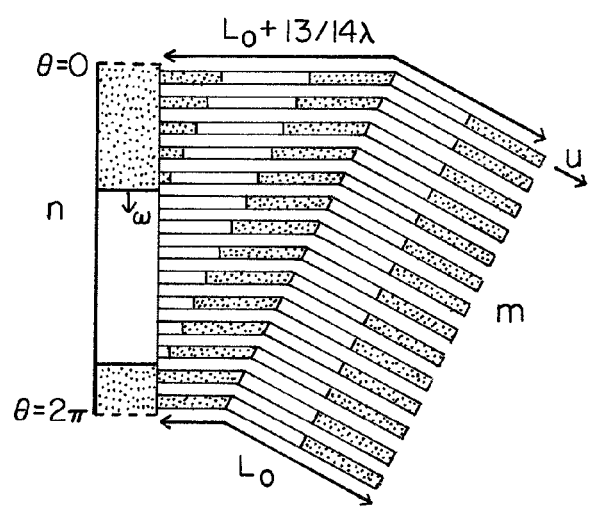

FIGS. 4a-b display schematically in polar coordinates pulse trains from an exemplary rotating two-chamber valve apparatus without (FIG. 4a) and with (FIG. 4b) phase delayed outlets as realized through tailor suited fluid paths. One large main phase outlet n is shown to the left in each of FIGS. 4a-b extending $2\pi$ radians of the circumference, that is, around the entire circumference, of the casing of the rotating valve apparatus. Fourteen sub-outlets m are shown to the right in each of FIGS. 4a-b. The chamber separating wall sweeps by a number of sub-outlets with angular velocity $\omega=2\pi f$. The sub-outlets can be separated physically, that is, be separated outlet pipes, or they can be separated portions within one or several main phase outlet pipes. Cold fluid is shown by white rectangles and hot fluid is shown by grey rectangles.

The sub-outlets in FIG. 4a are of equal length, and it can be seen that the trains of fluid pulses in the sub-outlets are phase-shifted with respect to one another as a result thereof. The thermal phase shift is $2\pi/14$ between neighbouring sub-outlets. By suitably designing the valve apparatus with phase-delayed outlets, that is outlets having fluid path lengths, which vary along the circumference of the casing of the rotating valve apparatus, the phase shifts may be equalized. Such solution is illustrated in FIG. 4b.

Fluid exiting the valve apparatus from any given sub-outlet m is phase shifted (phase delayed) with respect to fluid exiting the neighboring "next-in-turn-to-be-swept-by" sub-outlet m+1 by setting the length of the sub-outlet channel (pipe) to $$L=L_0+(u/f)[(M-m)/(MN)]$$

wherein $L_0$ is a common fixed length, m is the (phase internal) index of the sub-outlet, u is the average fluid velocity in the outlet, and f is the rotational frequency of the rotating valve apparatus. This procedure should ensure that trains of fluid pulses exiting the ends of the phase outlets are all in phase.

For the described arrangement to operate as desired, it is required that there is no significant thermal degradation of the thermal pulse shape over fluid path distance comparable to maximum difference in sub-outlet length, i.e. (u/f)/N.

The possible number of sub-outlets is virtually infinite, and the outlets are preferably positioned with minimal separation, so as to attain largest possible total outlet area. Factors like finite minimum thickness of separating walls and maximum allowed pressure drop will restrict the freedom of choice.

Figure 5:
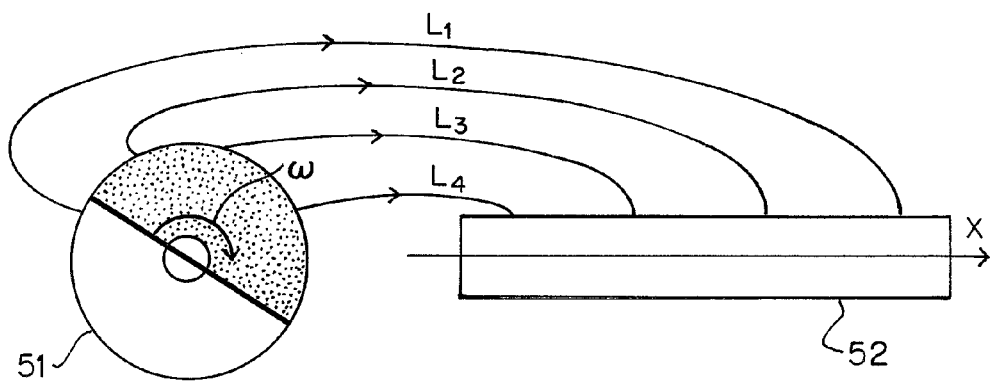
FIGS. 5-7 display each schematically in a cross sectional view a rotating valve apparatus with phase delayed outlets according to a respective embodiment of the invention.

FIG. 5 displays schematically an application of a rotating valve apparatus with phase delayed outlets according to an embodiment of the invention. The rotating valve apparatus 51 has a plurality of outlet pipes $L_1$-$L_4$, which are connected side by side to a thermomagnetic core 52 of a magnetothermal generator. The different lengths of the outlet pipes $L_1$-$L_4$ are chosen according to the procedure described above so that the trains of fluid pulses in the outlet pipes $L_1$-$L_4$ are in phase when entering the thermomagnetic core 52 of the magnetothermal generator. The mean temperature in the thermomagnetic core 52 should be as homogeneous as possible along any line parallel to the x-axis at any instant of time.

To avoid the pressure differences due to different fluid path lengths, a corresponding path length adjustment could be made to the return paths, i.e., after the heat transfer to the thermomagnetic core 52.

FIG. 5 exemplifies how unavoidable differences in fluid path length when outputting the trains of fluid pulses from the rotating valve apparatus 51 into the thermomagnetic core 52 may be advantageously utilized to achieve synchronized thermal heating and cooling in a magnetothermal generator.

In the general concept of the rotating valve apparatus, the average fluid velocity in the outlet u and the rotational frequency of the rotating valve apparatus f may be used as independent control or design variables. By fixing the lengths of the sub-outlets and by requiring equalization of phase, there is one degree of freedom less for control, but still there subsists plenty of freedom in the choice of the design.

Figure 6:
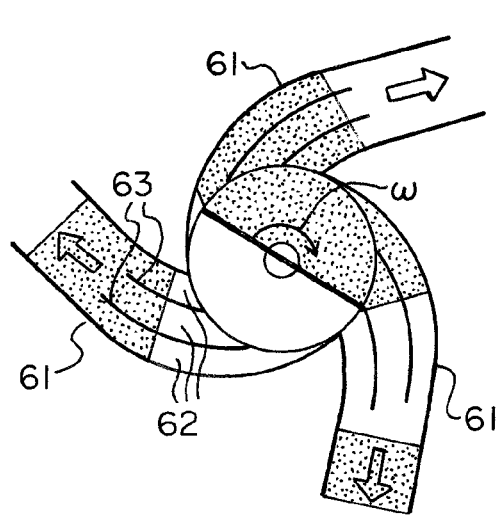

FIG. 6 displays schematically a rotating valve apparatus with phase delayed outlets according to an embodiment of the invention. The rotating valve apparatus is a three-phase rotating valve apparatus comprising three main phase outlets 61. Each of the main phase outlets comprises a number of sub-outlets 62 having fluid path lengths, which vary along the circumference of the casing of the rotating valve apparatus so that the phase shifts among the sub-outlets 62 of each of the three main phase outlets 61 are equalized. The sub-outlets 62 of each of the three main phase outlets 61 may be separate outlet pipes or laterally separated portions of a single outlet pipe, optionally, as being illustrated in FIG. 6, separated by fluid guiding structures 63. The cold fluid pulses are white and the hot fluid pulses are grey.

Figure 7:
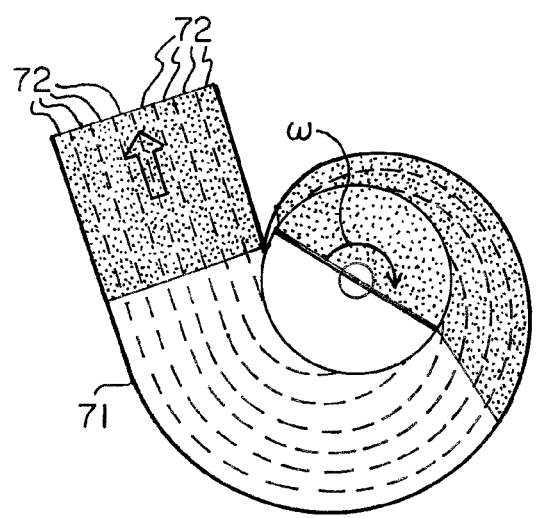

FIG. 7 displays schematically a rotating valve apparatus with phase delayed outlets according to a further embodiment of the invention. The rotating valve apparatus has a single main phase outlet pipe 71, which extends around the entire circumference of the rotating valve apparatus, and eight sub-outlets 72 which are laterally separated portions of the single main phase outlet pipe 71. The sub-outlets 72 can be looked upon as imaginary portions of the single main phase outlet pipe 71 and in the ideal case they should have a thickness, which is made infinitesimally small, to thereby obtain a solution where the interfaces between fluids originating from different ones of the inlets of the rotating valve apparatus will be a straight line vertical to the flow direction of the fluids downstream of the single main phase outlet pipe 71. The sub-outlets 72 may be separated by fluid guiding walls (not illustrated). As before, the cold fluid pulses are white and the hot fluid pulses are grey.

Alternative embodiments might encompass outlets based on pipes or hoses of different lengths.

An advantage of the present invention is that it allows a rotating valve apparatus design with an arbitrary number of outlets, with improved continuity of operation and virtually no fluid flow disruptions due to thermal switching. In particular, single-phase switching is trivially realized.

A larger total outlet area is obtainable as compared to the prior art valve, which reduces pressure drops and losses. The thermal quality of the pulse trains can be improved.

What is claimed is:

1. A valve apparatus comprising a cylindrical casing; a shaft arranged symmetrically in said casing; a member fixedly attached to said shaft and in close fit with said cylindrical casing, thereby defining separated chambers within the casing; at least one outlet fixedly arranged along the circumference of said casing; and a plurality of axially arranged inlets, each of which being constantly in fluid communication with a respective one of said separated chambers, wherein
   the separated chambers and thereby the axially arranged inlets are alternately in fluid connection with a circumferential reference point of said at least one outlet in response to rotation of said shaft and said member with respect to said casing, wherein
   said at least one outlet has a fluid path length that varies along the circumference of said casing depending on the rotational speed of said shaft and said member such that the interfaces between fluids originating from different ones of said axially arranged inlets will be essentially vertical to the flow direction of the fluids downstream of said at least one outlet; and
   wherein said valve apparatus comprises a plurality of outlets fixedly arranged along the circumference of said casing; and the separated chambers and thereby the axially arranged outlets are alternately in fluid connection with each of the outlets fixedly arranged along the circumference of said casing in response to the rotation of said shaft and said member with respect to said casing.

2. The valve apparatus of claim 1, wherein said interfaces between fluids originating from different ones of said axially arranged inlets are essentially planar surfaces.

3. The valve apparatus of claim 1, wherein said valve apparatus comprises a single outlet fixedly arranged along a major part of the circumference of said casing.

4. The valve apparatus of claim 3, wherein said single outlet is provided with fluid guiding walls arranged parallel with a fluid direction in said single outlet, thereby defining a plurality of sub-outlets.

5. The valve apparatus of claim 1, wherein said plurality of outlets have each a fluid path length that varies along the circumference of said casing depending on the rotational speed of said shaft and said member such that the interfaces between fluids originating from different ones of said axially arranged inlets will be essentially perpendicular to the flow direction of the fluids downstream of the respective outlet.

6. The valve apparatus of claim 5, wherein said plurality of outlets are each provided with fluid guiding walls arranged parallel with a fluid direction of the respective outlet, thereby defining a plurality of sub-outlets in each of the plurality of outlets.

7. The valve apparatus of claim 1, wherein said valve apparatus is used in a generator system for converting thermal energy to electric energy.

8. The valve apparatus of claim 7 further comprising a magnetothermal core wherein said at least one outlet of the valve apparatus is connected to said magnetothermal core, thereby ensuring that laterally separated portions of fluid pulses in said at least one outlet are in phase when entering the thermomagnetic core.

9. An electric power plant comprising the generator system of claim 7.

10. A method of producing electric power which comprises utilizing the apparatus of claim 1.

* * * * *